United States Patent

Tanaka et al.

Patent Number: 5,942,303
Date of Patent: Aug. 24, 1999

[54] RESIN COMPOSITION FOR POLYMERIZATION CASTING AND OPTICAL MATERIAL

[75] Inventors: Katsuyoshi Tanaka, Oita; Shuji Suyama, Aichi-ken; Tetsuro Tashiro, Oita, all of Japan

[73] Assignee: NOF Corporation, Tokyo, Japan

[21] Appl. No.: 08/804,975

[22] Filed: Feb. 20, 1997

[30] Foreign Application Priority Data

Sep. 5, 1996 [JP] Japan ................................. 8-235295

[51] Int. Cl.⁶ ........................................................ B32B 3/02
[52] U.S. Cl. ..................... 428/64.4; 428/64.7; 428/65.1; 428/900; 526/314; 526/318; 526/318.1; 526/318.43; 526/319; 526/321; 526/323.1; 526/373.2; 526/328; 526/328.5; 526/329.6; 264/22; 369/283; 369/284
[58] Field of Search ................... 428/64.4, 64.7, 428/65.1, 900; 264/22; 369/283, 284; 526/314, 318, 318.1, 318.43, 319, 321, 323.1, 323.2, 328, 328.5, 329.6

[56] References Cited

U.S. PATENT DOCUMENTS

| | | | |
|---|---|---|---|
| 4,729,938 | 3/1988 | Tajima | 430/270.11 |
| 4,751,124 | 6/1988 | Matsuzawa | 428/65.1 |
| 4,835,027 | 5/1989 | Sudo | 428/65.1 |
| 4,906,498 | 3/1990 | Ichikawa | 428/65.1 |
| 5,118,548 | 6/1992 | Ohkubo | 428/65.1 |

*Primary Examiner*—Leszek Kiliman
*Attorney, Agent, or Firm*—Darby & Darby

[57] ABSTRACT

A resin composition for polymerization casting containing:
20 to 60% by weight of a monomer (1) represented by the formula (1)

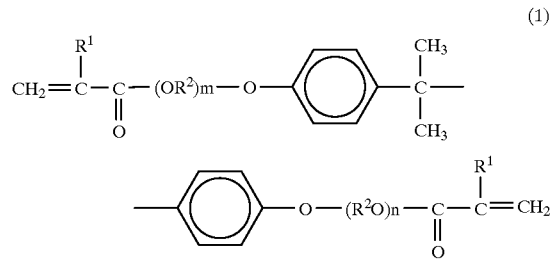

wherein $R^1$ stands for a hydrogen atom or a methyl group, $R^2$ stands for an alkylene group having 2 to 4 carbon atoms, m and n each is an integer of 2 to 5;

10 to 40% by weight of a monomer (2) represented by the formula (2)

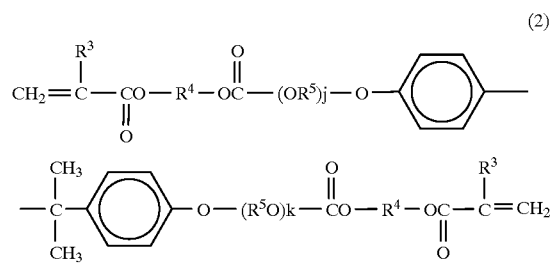

wherein $R^3$ stands for a hydrogen atom or a methyl group, $R^4$ and $R^5$ are the same or different groups and each stands for an alkylene group having 2 to 4 carbon atoms, j and k each is 0 or 1; and 5 to 70% by weight of a monomer (3), the monomer (3) being identical with neither monomers (1) nor (2), and containing at least one vinyl group in a molecule thereof.

9 Claims, No Drawings

RESIN COMPOSITION FOR POLYMERIZATION CASTING AND OPTICAL MATERIAL

BACKGROUND OF THE INVENTION

The present invention relates to a resin composition for polymerization casting which is useful for preparing an optical material such as a plastic lens, and an optical material having an excellent impact resistance, low specific gravity, and light weight.

Various studies have been made on organic glass as a substitution for inorganic glass. However, organic glass which has hitherto been made has various defects, and thus has never had sufficient properties. Typical example of the organic glass includes polyethylene glycol bis allyl carbonate. Polyethylene glycol bis allyl carbonate is typically used for preparing an optical material such as a plastic lens due to its excellent impact resistance, scratch resistance, castability, dyeability, and adhesivity to a hard coat film. However, polyethylene glycol bis allyl carbonate has refractive index of as low as 1.50, so that, when this compound is used for producing a concave lens (minus lens), the edge thickness of the concave lens (minus lens) becomes thick. Further, polyethylene glycol bis allyl carbonate has specific gravity of as large as about 1.32, so that the lens produced with this compound is heavy. Therefore, it is strongly demanded for an optical lens material to have high refractive index and low specific gravity at the same time. In an attempt to meet the demand, various resins having high refractive index have been proposed.

For example, it is proposed in Japanese Patent Publication Nos. 58-17527 and 3-45362 to produce a synthetic resin lens with a monomer composition containing di(meth)acrylate represented by the formula (3) below

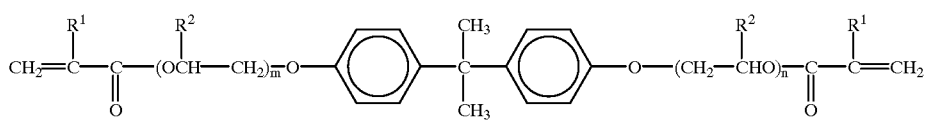

wherein $R^1$ and $R^2$ each stands for a hydrogen atom or a methyl group, m and n each is an integer of 0 to 2.

However, the mechanical strength and impact resistance of the synthetic resin lens are not yet sufficient.

It is also proposed in Japanese Patent Publication No. 6-93041 to produce a synthetic resin lens with a monomer composition containing di(meth)acrylate compound represented by the formula (4):

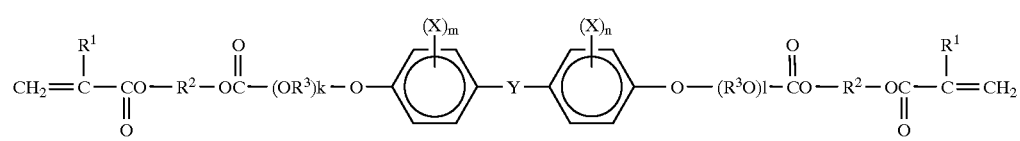

wherein $R^1$ stands for a hydrogen atom or a methyl group, $R^2$ and $R^3$ each stands for an alkylene group having 2 to 6 carbon atoms, X stands for a hydrogen atom, a chlorine atom, a bromine atom, an iodine atom, or an alkylene group having 1 to 4 carbon atoms, Y stands for an atomic group selected from a straight or a branched alkylene group having 1 to 3 carbon atoms, —O—, —S—, —SO—, or —SO$_2$—, m+n is 0 or an integer of 1 to 4, k+l is an integer of 0 to 12.

This publication discloses a variety of monomers wherein Y and k+l vary, respectively, as embodiments of the di(meth)acrylate compound represented by the formula (4). However, homopolymers of these monomers has specific gravity of as large as 1.25 or larger, and insufficient impact resistance. The publication also discloses to mix two or more kinds of the di(meth)acrylate compounds represented by the formula (4), and to combine the compound with other monomers. However, the combinations described specifically in the publication do not have sufficient lightness in weight, heat resistance, impact resistance, or the like.

DISCLOSURE OF THE INVENTION

It is an object of the present invention to provide an optical material having improved impact resistance and reduced specific gravity without deteriorating refractive index, colorlessness, transparency, heat resistance, and resistance to solvents, and a resin composition for polymerization casting which can be used as a starting material for such optical material.

According to the present invention, there is provided a resin composition for polymerization casting comprising:

20 to 60% by weight of a monomer (1) represented by the formula (1)

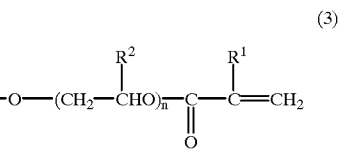

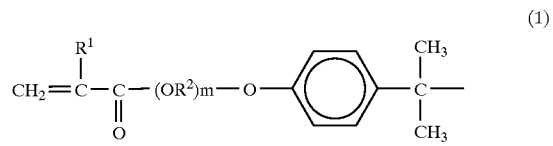

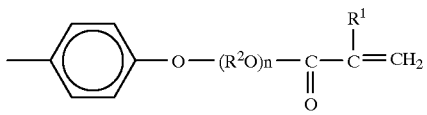

wherein $R^1$ stands for a hydrogen atom or a methyl group, $R^2$ stands for an alkylene group having 2 to 4 carbon atoms, m and n each is an integer of 2 to 5;

10 to 40% by weight of a monomer (2) represented by the formula (2)

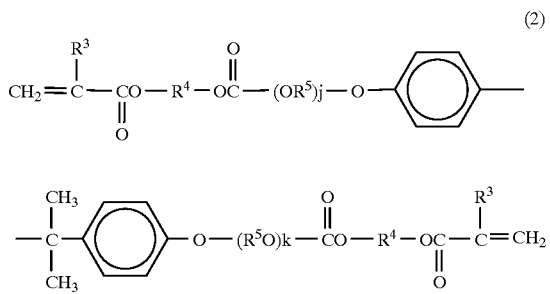

(2)

wherein $R^3$ stands for a hydrogen atom or a methyl group, $R^4$ and $R^5$ are the same or different groups and each stands for an alkylene group having 2 to 4 carbon atoms, j and k each is 0 or 1; and 5 to 70% by weight of a monomer (3), said monomer (3) being identical with neither monomers (1) nor (2), and containing at least one vinyl group in a molecule thereof.

According to the present invention, there is further provided an optical material obtained by curing the above resin composition for polymerization casting by polymerization.

PREFERRED EMBODIMENTS OF THE INVENTION

The resin composition for polymerization casting of the present invention contains a monomer (1) represented by the formula (1), a monomer (2) represented by the formula (2), and a particular monomer (3) other than the monomers (1) and (2) in particular ratio.

In the formula (1), $R^1$ stands for a hydrogen atom or a methyl group. Of these methyl group is preferred for improving heat resistance of a resin material obtained by curing the resin composition by polymerization. Each of m and n is an integer of 2 to 5, preferably 3 or 4 for attaining sufficient refractive index, heat resistance, and impact resistance of the resin material obtained by curing the resin composition at the same time. If at least one of m and n is less than 2, impact resistance is not sufficient, though refractive index and heat resistance are sufficient. If at least one of m and n exceeds 5, hardness and heat resistance of the resin material are lowered. In the monomer (1), —($OR^2$)— also represents a compound having different atomic groups in a molecule thereof, such as 2,2-bis(4-methacryloyloxypropyloxyethoxyphenyl)propane.

The monomer (1) imparts softness to and improves impact resistance and grindability of the resin material obtained by curing the resin composition. Examples of the monomer (1) may include 2,2-bis(4-methacryloyloxyethoxyethoxyphenyl)propane,
2,2-bis(4-acryloyloxyethoxyethoxyphenyl)propane,
2,2-bis(4-methacryloyloxyethoxyethoxyethoxyphenyl) propane,
2,2-bis(4-acryloyloxyethoxyethoxyethoxyphenyl) propane,
2,2-bis(4-methacryloyloxypropyloxypropyloxyphenyl) propane,
2,2-bis(4-acryloyloxypropyloxypropyloxyphenyl) propane,
2,2-bis(4-methacryloyloxypropyloxypropyloxypropyloxyphenyl)propane,
2,2-bis(4-acryloyloxypropyloxypropyloxypropyloxyphenyl)propane,
2,2-bis(4-methacryloyloxypropyloxyethoxyphenyl) propane,
2,2-bis(4-methacryloyloxypropyloxypropyloxyethoxyethoxyphenyl)propane, and
2-(4-methacryloyloxyethoxyethoxyphenyl)-2-(4-methacryloyloxyethoxyethoxyethoxyphenyl)propane.
These monomers may be used alone or in mixture.

The content of the monomer (1) is 20 to 60% by weight, preferably 25 to 55% by weight of the total weight of all the monomers contained in the resin composition. If the content is less than 20% by weight, the resin material obtained by curing the resin composition cannot sufficiently be reduced in weight, and is declined in weatherability and impact resistance. If the content exceeds 60% by weight, hardness and heat resistance of the obtained resin material are declined.

In the formula (2), $R^3$ stands for a hydrogen atom or a methyl group. Of these methyl group is preferred for improving heat resistance of the resin material obtained by curing the resin composition. Each of $R^4$ and $R^5$ has 2 to 4, preferably 2 or 3 carbon atoms for attaining sufficient refractive index and heat resistance of the resin material obtained by curing the resin composition. Each of j and k is 0 to 1 for attaining sufficient refractive index and heat resistance of the resin material obtained by curing the resin composition.

The monomer (2), having carbonate groups, improves mechanical strength, heat resistance, and impact resistance of the resin material obtained by curing the resin composition. Examples of the monomer (2) may preferably include compounds represented by the formulae below, respectively. These compounds may be used alone or in mixture.

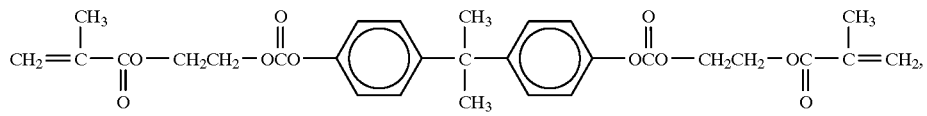

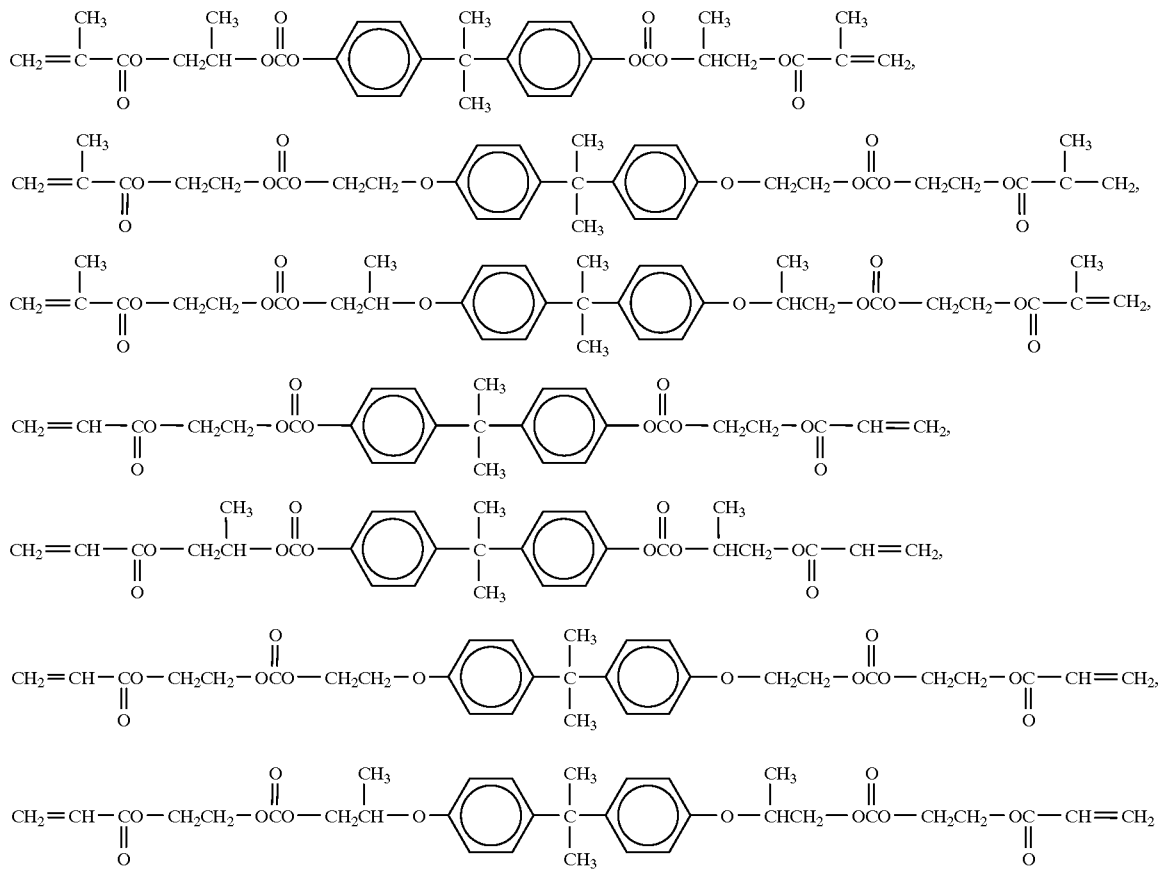

The content of the monomer (2) is 10 to 40% by weight, preferably 15 to 35% by weight of the total weight of all the monomers contained in the resin composition. If the content is less than 10% by weight, mechanical strength and heat resistance of the resin material obtained by curing the rein composition are declined. If the content exceeds 40% by weight, viscosity of the composition is increased, causing difficulties in the production of the resin material. Further, the obtained resin material is raised excessively in specific gravity and in hardness, resulting in declining of impact resistance.

The monomer (3) is identical with neither monomers (1) nor (2), and has at least one vinyl group in a molecule thereof. Examples of the monomer (3) may include, for example, styrene, α-methylstyrene, vinyltoluene, p-chlorostyrene, o-chlorostyrene, p-bromostyrene, o-bromostyrene, divinylbenzene, divinylbiphenyl, vinyl acetate, vinyl propionate, vinyl benzoate, (meth)acrylic acid, methyl (meth)acrylate, ethyl (meth)acrylate, isopropyl (meth)acrylate, allyl (meth)acrylate, phenyl (meth)acrylate, benzyl (meth)acrylate, p-chlorophenyl (meth)acrylate, p-chlorobenzyl (meth)acrylate, p-bromophenyl (meth) acrylate, p-bromobenzyl (meth)acrylate, naphthyl (meth) acrylate, (meth)acrylamide, N,N-dimethyl (meth) acrylamide, N,N-diethyl (meth)acrylamide, 2-hydroxy-3-phenoxypropyl (meth)acrylate, ethylene glycol di(meth) acrylate, diethylene glycol di(meth)acrylate, polyethylene glycol di(meth)acrylate, propylene glycol di(meth)acrylate, dipropylene glycol di(meth)acrylate, polypropylene glycol di(meth)acrylate, glycerol di(meth)acrylate, 3-acryloyloxyglycerol monomethacrylate, trimethylolpropane tri(meth)acrylate, pentaerythritol tetra(meth)acrylate, 2,2-bis(4-(meth) acryloyloxy(2'-hydroxypropyloxy)phenyl) propane, diisopropyl fumarate, diisopropyl maleate, dibenzyl fumarate, dibenzyl maleate, dibenzyl mesaconate, maleic anhydride, and itaconic anhydride. These monomers may be used alone or in mixture. Of these styrene and p-chlorostyrene are preferred for improving refractive index of the resin material obtained by curing the resin composition, resulting in further reduction in specific gravity. Alternatively, a cross-linking monomer such as ethylene glycol dimethacrylate or diethylene glycol dimethacrylate is also preferred for further improving heat resistance of the resin material obtained by curing the resin composition.

The content of the monomer (3) is 5 to 70% by weight, preferably 10 to 60% by weight of the total weight of all the monomers contained in the resin composition.

The resin composition of the present invention may be made into a variety of resin materials including the optical material to be described later, for example, by adding a curing agent to the resin composition, charging the resulting mixture in a desired mold, and effecting a curing reaction of the mixture under heating.

Upon effecting the curing reaction of the resin composition of the present invention, a coloring agent such as dyes and pigments, an ultraviolet absorbing agent, an antioxidant, a variety of stabilizers, an antistatic agent, photochromic compounds, a fluorescent brightening agent, an internal releasing agent, a polymerization modifier, or the like maybe added to the resin composition as required.

Examples of the polymerization modifier may include carbon tetrachloride, thiol, and α-methylstyrene dimer. Of these α-methylstyrene dimer is preferred in view of handling and odor. The content of the polymerization modifier, if added, is preferably 0.01 to 5 parts by weight, more preferably 1 to 3 parts by weight per 100 parts by weight of the resin composition for polymerization casting. If the content is less than 0.01 parts by weight, sufficient adjustment of polymerization degree cannot be achieved. If the content exceeds 5 parts by weight, polymerization degree is excessively lowered, causing remarkable declining of heat resistance and weatherability of the obtained resin material, thus being not preferred.

The optical material of the present invention is obtained by curing the resin composition for polymerization casting of the present invention by polymerization. In preparing the optical material, a curing agent may be added to the resin composition, such as an azo polymerization initiator, an organic peroxide polymerization initiator, or a mixture thereof, each having 10-hour half life period temperature of not higher than 120° C. Examples of the azo polymerization initiator may preferably include, for example, 2,2-azobis(2, 4-dimethylvaleronitrile, 2,2-azobisisobutyronitrile, 2,2-azobis(2-methylbutyronitrile), 1,1-azobis(cyclohexane-1-carbonitrile), and dimethyl-2,2-azobisisobutylate. Examples of the organic peroxide polymerization initiatormay preferably include, for example, benzoyl peroxide, diisopropylperoxydicarbonate, di-n-propylperoxydicarbonate, bis(4-t-butylcyclohexyl) peroxydicarbonate, t-butylperoxyisopropylcarbonate, 1,1-bis(t-butylperoxy)-3,3,5-trimethylcyclohexane, t-butylperoxyneodecanoate, t-butylperoxypivalate, and t-butylperoxy-2-ethylhexanoate. The amount of the curing agent is preferably 0.05 to 5 parts by weight, more preferably 1 to 4 parts by weight per 100 parts by weight of the resin composition for polymerization casting. If the amount is less than 0.05 parts by weight, the resin composition cannot be cured sufficiently, causing poor properties of the resulting optical material. If the amount exceeds 5 parts by weight, control of the curing reaction becomes hard, and cracks are likely to form on the surface of the molded product, thus being not preferred.

It is preferred to carry out the curing reaction by polymerization of the resin composition for polymerization casting in an atmosphere fully or partially substituted by an inert gas such as nitrogen, helium, or carbon dioxide. The curing temperature and the curing time may vary depending on the curing agent to be used, but it is preferred to carry out the curing reaction at 20 to 130° C. for 5 to 48 hours. During the curing reaction by polymerization, the temperature of the reaction system may suitably be raised for shortening the curing time, for completing the curing reaction, and for decomposing the unreacted curing agent. For example, the temperature of the reaction system may initially be about 30° C. lower than the 10-hour half life period temperature of the curing agent to be used, and gradually raised to the final temperature of about 30° C. higher than the 10-hour half life period temperature for completing the curing reaction.

Since the cured and molded product obtained by such curing reaction under heating contains internal strains, it is preferred to subject the cured and molded product to an annealing process preferably at 100 to 140° C., more preferably at 110 to 130° C. for over 30 minutes and less than 6 hours, preferably 1 to 4 hours. If viscosity of the resin composition for polymerization casting is low, or if the shrinkage upon curing is large, it is preferred to preliminarily polymerize the resin composition before being charged into the mold for curing reaction by polymerization.

The optical material of the present invention and the molded resin material obtained by curing the resin composition for polymerization casting of the present invention by polymerization may be provided with an ordinary hard coat film for further improving the surface wear resistance. The hard coat film may be provided by applying a conventional hard coat agent over the surface of the material followed by drying. In order to improve the adhesivity of the hard coat film, it is preferred to apply a primer solution over the surface of the optical material or the like before applying the hard coat agent thereon. The primer solution may be a solution of polyurethane, melamine, or the like. The hard coat agent and the primer solution may be applied by a dipping method, a spin coating method, a flow coating method, a spraying method, or the like method. Further, the optical material and the molded resin material may be provided with an anti-reflection film for suppressing surface reflection, thereby improving transmittance of visible light.

The resin composition for polymerization casting of the present invention forms less internal strains upon polymerization thereof, and is superior in castability. Further, the optical material of the present invention has well-balanced properties necessary for use. It is particularly superior in impact resistance, heat resistance, and hardness as well as transparency and refractive index, and has low specific gravity and light weight. Therefore, it is useful as a lens material for eye glasses, contact lens, and the like.

EXAMPLES

The present invention is now described with reference to Examples and Comparative Examples, but it is not limited thereto.

Example 1

55 parts by weight of a compound (A) represented by the formula (A) as the monomer (1), 20 parts by weight of a compound (a) represented by the formula (a) as the monomer (2), and 25 parts by weight of styrene as the monomer (3) were mixed together to prepare a resin composition for polymerization casting. To the resin composition was added 1.0 parts by weight of t-butylperoxy-2-ethylhexanoate as a polymerization initiator. The resulting mixture was charged into a casting mold composed of two glass plates and a silicone gasket, heated in a 70° C. thermostat for 12 hours, and further heated at 100° C. for 4 hours. Then the cured molded product was taken out of the mold, and annealed at 120° C. for 4 hours, thereby preparing an optical material. The resulting optical material was evaluated as to the following properties. The compositions and contents of the monomers, and types and contents of the polymerization initiator are shown in Table 1, and the results of the evaluation are shown in Table 2.

Compound (A)

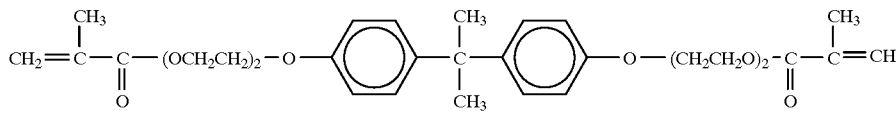

(A)

Compound (a)

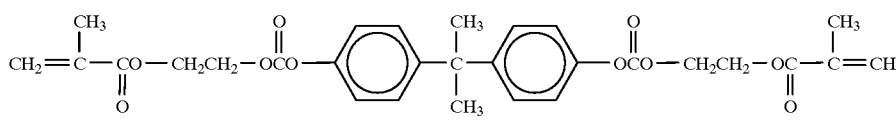

(a)

Refractive index and Abbe's number of the optical material were measured with an Abbe's refractometer manufactured by ATAGO INC. The higher the Abbe's number, the lower the wavelength dependency of the material, thus being preferred.

Specific gravity of the optical material was determined by (weight of the optical material/volume of the optical material) ratio measured by an in-water substitution method.

Impact resistance of the optical material was determined by dropping steel balls weighing 16.3 g, 28.2 g, 35.8 g, 44.7 g, and 66.8 g, respectively, onto the optical material having the diameter of 8 cm and the thickness of 1.8 mm from a height of 127 cm in the order of increasing weight. Five samples of the optical material were subjected to this test, and the evaluation was made on the average weight of the heaviest balls with which the sample materials had not been cracked.

Strain of the optical material was observed under a strain viewer (trade name: SVP-200; manufactured by Toshiba Glass KK). Samples free of strains were marked ○, whereas samples having strains were marked X.

Heat resistance of the optical material was determined by observing the optical material with eyes and with the strain viewer after allowing the sample to stand in a drier at 130° C. for 2 hours. Samples free of changes such as deformation, cracking, deterioration on the surface, and discoloration were marked ○, whereas samples in which these changes were observed were marked Solvent resistance of the optical material was determined after allowing the sample to stand in acetone for 2 hours. Samples free of changes such as deformation, cracking, and discoloration were marked ○, whereas samples in which these changes were observed were marked X.

Hardness of the optical material was measured by a pencil hardness test in accordance with JIS K-5400.

Examples 2 to 12

An optical material was prepared through the same curing reaction, molding, and annealing as in Example 1 except that the monomers and the polymerization initiator shown in Table 1 were employed. However, when 2,2'-azobisisobutyronitrile and dimethyl-2,2'-azobisisobutylate were used as the polymerization initiators, the heating was carried out at 65° C. for 12 hours, and further at 100° C. for 4 hours. When benzoyl peroxide and t-butylperoxy-2-ethylhexanoate were used as the polymerization initiators, the heating was carried out at 70° C. for 12 hours, and further at 100° C. for 4 hours. When t-butyl peroxyneodecanoate was used as the polymerization initiator, the heating was carried out at 40° C. for 12 hours, and further at 90° C. for 4 hours. The resulting optical material was evaluated as in Example 1. The results are shown in Table 2.

Comparative Examples 1 to 7

An optical material was prepared through the same curing reaction, molding, and annealing as in Example 1 except that the monomers and the polymerization initiator shown in Table 1 were employed. The resulting optical material was evaluated as in Example 1. The results are shown in Table 2.

Incidentally, the abbreviations in Table 1 stand for the following chemical formulae, respectively.

Compound (B)

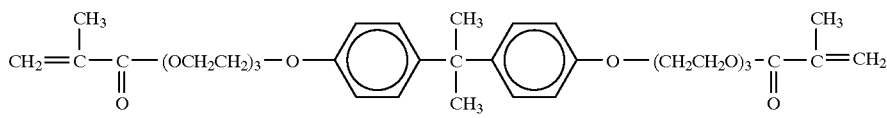

(B)

-continued

Compound (C)

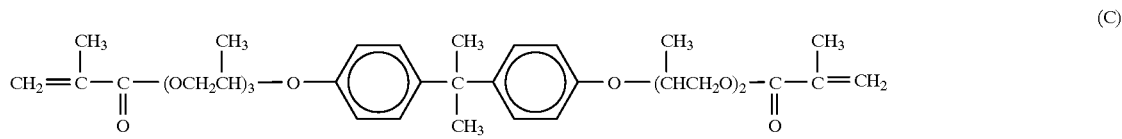

Compound (D)

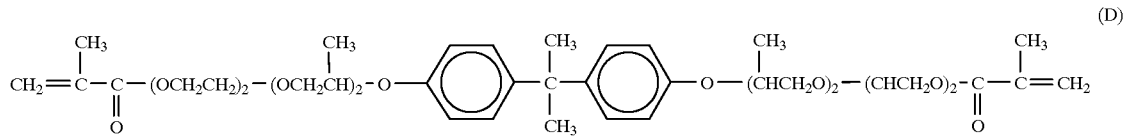

Compound (b)

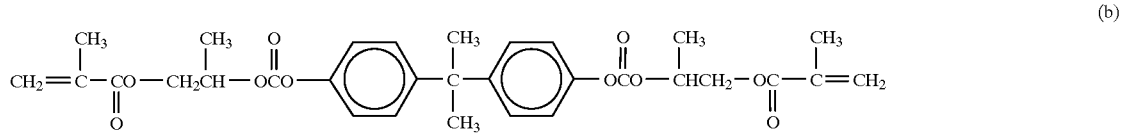

Compound (c)

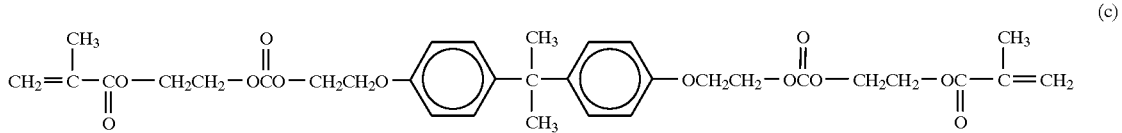

St: styrene
C-St: p-chlorostyrene
DEGDM: diethylene glycol dimethacrylate
TEGDM: triethylene glycol dimethacrylate
BzMA: benzylmethacrylate
MMA: methylmethacrylate
DBzF: dibenzyl fumarate
CR-39: diethylene glycol bis allyl carbonate
TBPE: t-butylperoxy-2-ethylhexanoate
TBPN: t-butyl peroxyneodecanoate
AIBN: 2,2'-azobisisobutyronitrile
MAIB: dimethyl-2,2'-azobisisobutylate
BPO: benzoyl peroxide
IPP: diisopropylperoxydicarbonate

TABLE 1

|  | Monomer (1) (wt %) | Monomer (2) (wt %) | Monomer (3) (wt %) | Polymerization (parts by weight) |
|---|---|---|---|---|
| Example 1 | Compound (A) (55) | Compound (a) (20) | St (25) | TBPE (1.0) |
| Example 2 | Compound (A) (40) | Compound (a) (15) | St, TEGDM (25), (20) | TBPE (1.2) |
| Example 3 | Compound (A) (50) | Compound (a) (20) | MMA, DBzF (20), (10) | TBPN (2.0) |
| Example 4 | Compound (B) (50) | Compound (a) (30) | St (20) | AIBN (1.5) |
| Example 5 | Compound (B) (40) | Compound (a) (30) | St, DEGDM (20), (10) | MAIB (1.5) |
| Example 6 | Compound (B) (30) | Compound (a) (20) | St, MMA (30), (20) | TBPE (1.0) |
| Example 7 | Compound (D) (35) | Compound (a) (35) | BzMA (30) | TBPE (1.0) |
| Example 8 | Compound (A) (55) | Compound (b) (20) | MMA (25) | TBPN (1.5) |
| Example 9 | Compound (C) (50) | Compound (b) (20) | St (30) | BPO (1.0) |
| Example 10 | Compound (A) (40) | Compound (c) (20) | C-St, MMA (15), (25) | TBPN (1.5) |
| Example 11 | Compound (B) (40) | Compound (c) (15) | St, DEGDM (20), (25) | TBPE (1.2) |
| Example 12 | Compound (C) (50) | Compound (c) (20) | C-St, DBzF (20), (10) | TBPN (2.0) |
| Comp. Ex. 1 | — | — | CR-39 (100) | IPP (3.5) |
| Comp. Ex. 2 | — | Compound (a) (100) | — | TBPN (1.5) |
| Comp. Ex. 3 | — | Compound (c) (50) | DEGDM (50) | TBPN (1.5) |
| Comp. Ex. 4 | — | Compound (a) (70) | BzMA (30) | TBPE (1.2) |
| Comp. Ex. 5 | Compound (A) (60) | — | St (40) | TBPE (1.2) |
| Comp. Ex. 6 | Compound (D) (70) | Compound (a) (5) | St (25) | TBPE (1.2) |
| Comp. Ex. 7 | Compound (B) (10) | Compound (c) (50) | BzMA (40) | TBPE (1.2) |

TABLE 2

| | Refractive Index | Specific Gravity | Impact Resistance | Strain | Heat Resistance | Solvent Resistance | Hardness |
|---|---|---|---|---|---|---|---|
| Example 1 | 1.57 | 1.169 | 66.8 g | ○ | ○ | ○ | 3H |
| Example 2 | 1.55 | 1.159 | 66.8 g | ○ | ○ | ○ | 3H |
| Example 3 | 1.55 | 1.179 | 66.8 g | ○ | ○ | ○ | 2H |
| Example 4 | 1.56 | 1.179 | 66.8 g | ○ | ○ | ○ | 3H |
| Example 5 | 1.56 | 1.189 | 66.8 g | ○ | ○ | ○ | 3H |
| Example 6 | 1.56 | 1.159 | 66.8 g | ○ | ○ | ○ | 3H |
| Example 7 | 1.55 | 1.189 | 66.8 g | ○ | ○ | ○ | 2H |
| Example 8 | 1.54 | 1.189 | 66.8 g | ○ | ○ | ○ | 3H |
| Example 9 | 1.57 | 1.159 | 66.8 g | ○ | ○ | ○ | 2H |
| Example 10 | 1.55 | 1.179 | 66.8 g | ○ | ○ | ○ | 3H |
| Example 11 | 1.55 | 1.179 | 66.8 g | ○ | ○ | ○ | 2H |
| Example 12 | 1.57 | 1.169 | 66.8 g | ○ | ○ | ○ | 2H |
| Comp. Ex. 1 | 1.5 | 1.320 | 44.7 g | ○ | ○ | ○ | 2H |
| Comp. Ex. 2 | 1.54 | 1.260 | 28.2 g | ○ | ○ | ○ | 3H |
| Comp. Ex. 3 | 1.53 | 1.254 | 35.8 g | ○ | ○ | ○ | 2H |
| Comp. Ex. 4 | 1.55 | 1.233 | 35.8 g | x | ○ | ○ | H |
| Comp. Ex. 5 | 1.57 | 1.139 | 16.3 g | ○ | ○ | ○ | H |
| Comp. Ex. 6 | 1.56 | 1.172 | 44.7 g | ○ | x | ○ | HB |
| Comp. Ex. 7 | 1.55 | 1.215 | 35.8 g | ○ | x | ○ | H |

Although the present invention has been described with reference to the preferred examples, it should be understood that various modifications and variations can be easily made by those skilled in the art without departing from the spirit of the invention. Accordingly, the foregoing disclosure should be interpreted as illustrative only and is not to be interpreted in a limiting sense. The present invention is limited only by the scope of the following claims.

What is claimed is:

1. A resin composition for polymerization casting comprising:

20 to 60% by weight of a monomer (1) represented by the formula (1)

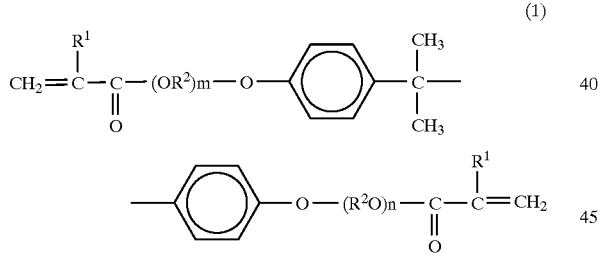

(1)

wherein $R^1$ stands for a hydrogen atom or a methyl group, $R^2$ stands for an alkylene group having 2 to 4 carbon atoms, m and n each is an integer of 2 to 5;

10 to 40% by weight of a monomer (2) represented by the formula (2)

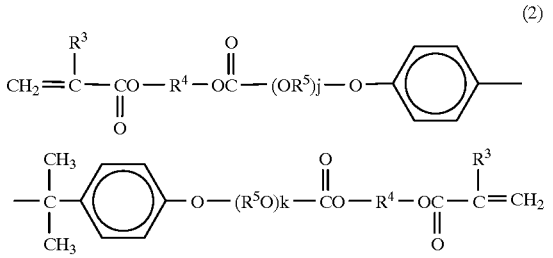

(2)

wherein $R^3$ stands for a hydrogen atom or a methyl group, $R^4$ and $R^5$ are the same or different groups and each stands for an alkylene group having 2 to 4 carbon atoms, j and k each is 0 or 1; and 5 to 70% by weight of a monomer (3), said monomer (3) being identical with neither monomers (1) nor (2), and containing at least one vinyl group in a molecule thereof.

2. The composition as claimed in claim 1 wherein said monomer (1) is selected from the group consisting of 2,2-bis(4-methacryloyloxyethoxyethoxyphenyl)propane, 2,2-bis(4-acryloyloxyethoxyethoxyphenyl)propane, 2,2-bis(4-methacryloyloxyethoxyethoxyethoxyphenyl)propane, 2,2-bis(4-acryloyloxyethoxyethoxyethoxyphenyl)propane, 2,2-bis(4-methacryloyloxypropyloxypropyloxyphenyl)propane, 2,2-bis(4-acryloyloxypropyloxypropyloxyphenyl)propane, 2,2-bis(4-methacryloyloxypropyloxypropyloxypropyloxyphenyl)propane, 2,2-bis(4-acryloyloxypropyloxypropyloxypropyloxyphenyl)propane, 2,2-bis(4-methacryloyloxypropyloxyethoxyphenyl)propane, 2,2-bis(4-methacryloyloxypropyloxypropyloxyethoxyethoxyphenyl)propane, 2-(4-methacryloyloxyethoxyethoxyphenyl)-2-(4-methacryloyloxyethoxyethoxyethoxyphenyl)propane, and mixtures thereof.

3. The composition as claimed in claim 1 wherein said monomer (2) is selected from the group consisting of compounds represented by the formulae below, respectively, and mixtures thereof:

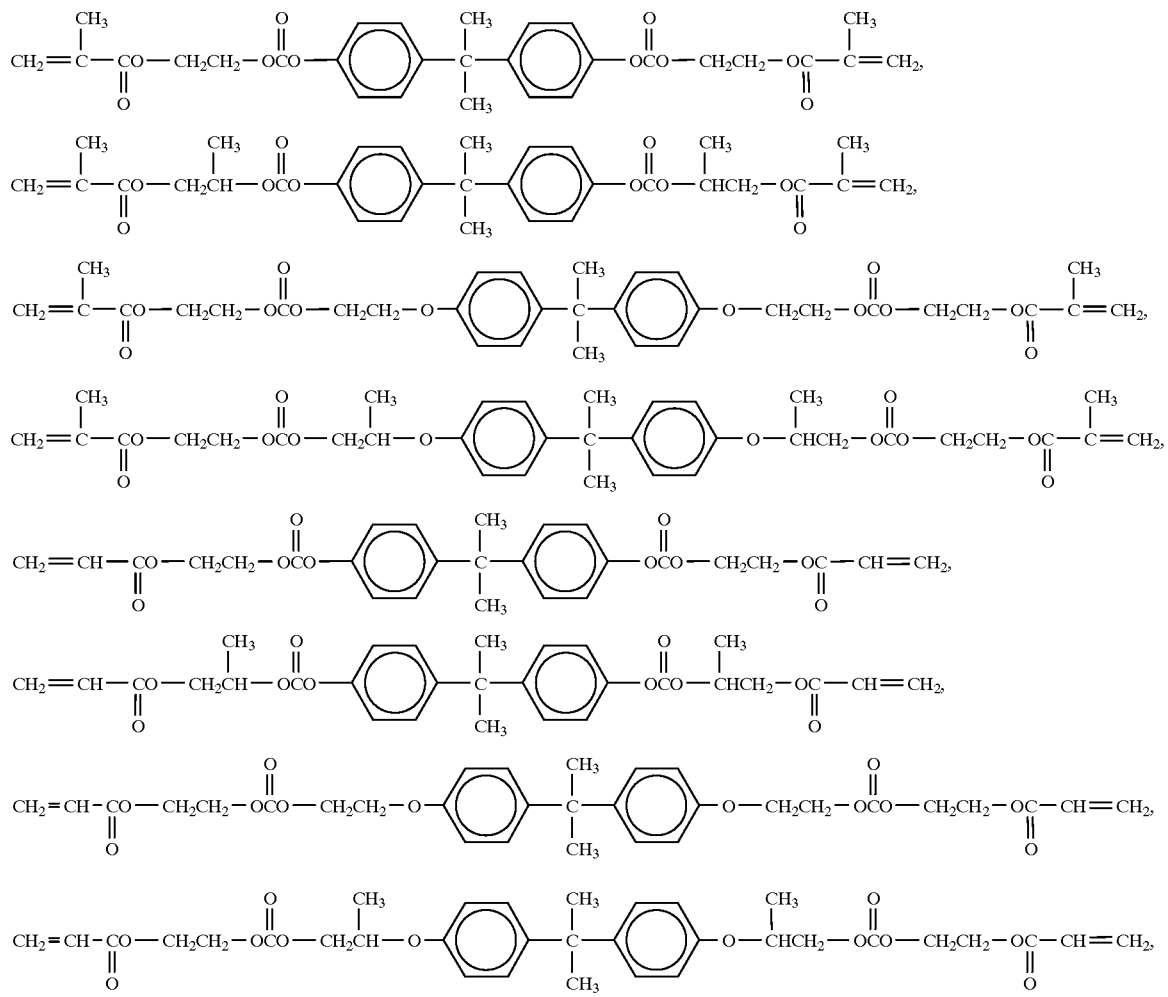

4. The composition as claimed in claim 1 wherein said monomer (3) is selected from the group consisting of styrene, α-methylstyrene, vinyltoluene, p-chlorostyrene, o-chlorostyrene, p-bromostyrene, o-bromostyrene, divinylbenzene, divinylbiphenyl, vinyl acetate, vinyl propionate, vinyl benzoate, (meth)acrylic acid, methyl (meth)acrylate, ethyl (meth)acrylate, isopropyl (meth) acrylate, allyl (meth)acrylate, phenyl (meth)acrylate, benzyl (meth)acrylate, p-chlorophenyl (meth)acrylate, p-chlorobenzyl (meth)acrylate, p-bromophenyl (meth) acrylate, p-bromobenzyl (meth)acrylate, naphthyl (meth) acrylate, (meth)acrylamide, N,N-dimethyl (meth) acrylamide, N,N-diethyl (meth)acrylamide, 2-hydroxy-3-phenoxypropyl (meth)acrylate, ethylene glycol di(meth) acrylate, diethylene glycol di(meth)acrylate, polyethylene glycol di(meth)acrylate, propylene glycol di(meth)acrylate, dipropylene glycol di(meth)acrylate, polypropylene glycol di(meth)acrylate, glycerol di(meth)acrylate, 3-acryloyloxyglycerol monomethacrylate, trimethylolpropane tri(meth)acrylate, pentaerythritol tetra(meth)acrylate, 2,2-bis(4-(meth) acryloyloxy(2'-hydroxypropyloxy)phenyl) propane, diisopropyl fumarate, diisopropyl maleate, dibenzyl fumarate, dibenzyl maleate, dibenzyl mesaconate, maleic anhydride, itaconic anhydride, and mixtures thereof.

5. An optical material obtained by curing the resin composition for polymerization casting as claimed in claim 1 by polymerization.

6. The optical material as claimed in claim 5 wherein said curing by polymerization is carried out in the presence of a curing agent selected from the group consisting of an azo polymerization initiator, an organic peroxide polymerization initiator, and mixtures thereof, each having a 10-hour half life period temperature of not higher than 120° C.

7. The optical material as claimed in claim 6 wherein an amount of said curing agent is 0.05 to 5 parts by weight per 100 parts by weight of the resin composition for polymerization casting.

8. The optical material as claimed in claim 5 wherein said curing by polymerization is carried out at 20 to 130° C. for 5 to 48 hours.

9. The optical material as claimed in claim 5 wherein said optical material is provided with at least one of a hard coat film and an anti-reflection film.

* * * * *